Aug. 23, 1932.  S. H. CHAMPLIN ET AL  1,872,889

ASPARAGUS GRADER AND CUTTER

Filed Aug. 27, 1929   2 Sheets-Sheet 1

INVENTORS
SILAS H. CHAMPLIN.
PARKER A. CUTTER.
FERDINAND KASTEN.
PAUL C. BUTTE.
BY *Miller Boyken & Bried*
ATTORNEYS.

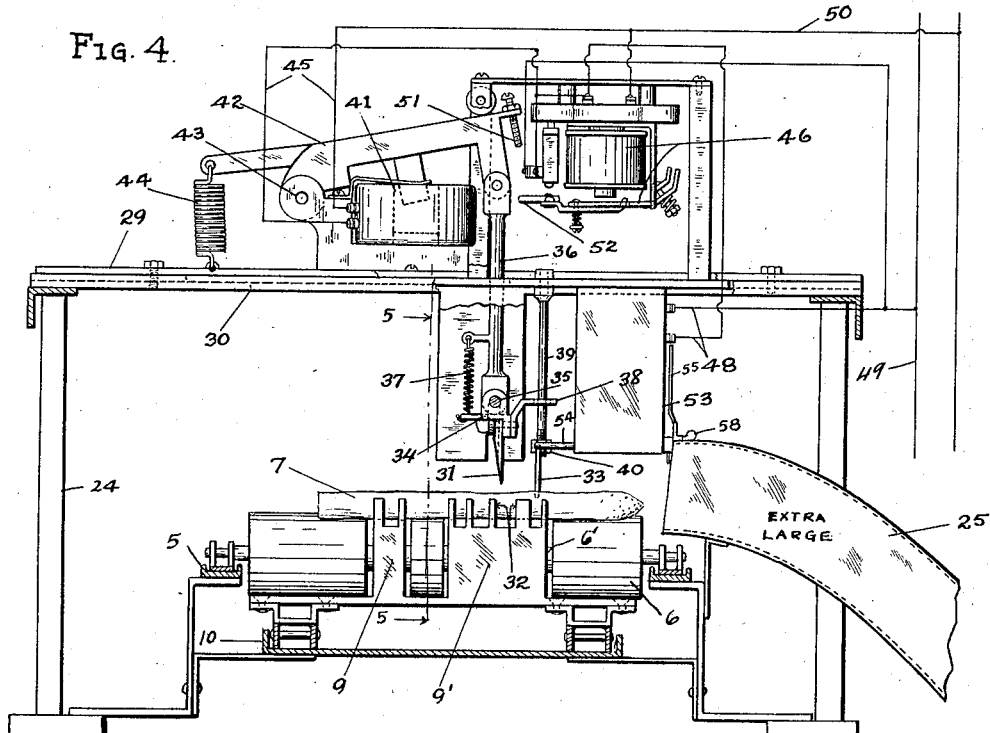

Patented Aug. 23, 1932

1,872,889

UNITED STATES PATENT OFFICE

SILAS H. CHAMPLIN, PARKER A. CUTTER, FERDINAND KASTEN, AND PAUL C. BUTTE, OF SAN FRANCISCO, CALIFORNIA, ASSIGNORS TO GOLDEN STATE ASPARAGUS CO., OF SAN FRANCISCO, CALIFORNIA, A CORPORATION OF CALIFORNIA

ASPARAGUS GRADER AND CUTTER

Application filed August 27, 1929. Serial No. 388,727.

This invention relates to apparatus for grading and cutting asparagus stalks preparatory to canning the same and has for its objects improvements in this type of apparatus whereby the effectiveness thereof is greatly enhanced.

In the drawings accompanying this application Fig. 1 is a longitudinal elevation of the complete apparatus.

Fig. 4 is an enlarged vertical section of a portion of the apparatus as seen from the line 4—4 of Fig. 1.

Fig. 5 is a fragmentary view, partly in section, taken along the line 5—5 of Fig. 4 and shows the relation to the cutter blade and grading finger.

Fig. 6 is a side view of Fig. 5, but shows the knife descended and the cut asparagus kicked off by the action of the blade.

Fig. 7 is a view of the opposite side of a portion of Fig. 5 showing the grading finger index or setting device.

Fig. 8 is a detached view of the grading finger shaft assembly to reveal its construction which adapts it for setting for any desired diameter of asparagus.

Figs. 9 and 10 show a modified form of conveyor.

Briefly described the invention comprises special cooperating endless conveyors for carrying the spears of grass along in spaced relation, means for feeding the grass and aligning it on the conveyors and electrically controlled grading fingers and guillotine-like knives which are tripped by the action of the grader fingers to instantly cut the graded spears and kick them from the conveyors, the various sizes being received respectively in different chutes to conduct them where desired for further canning operations.

Figure 1:
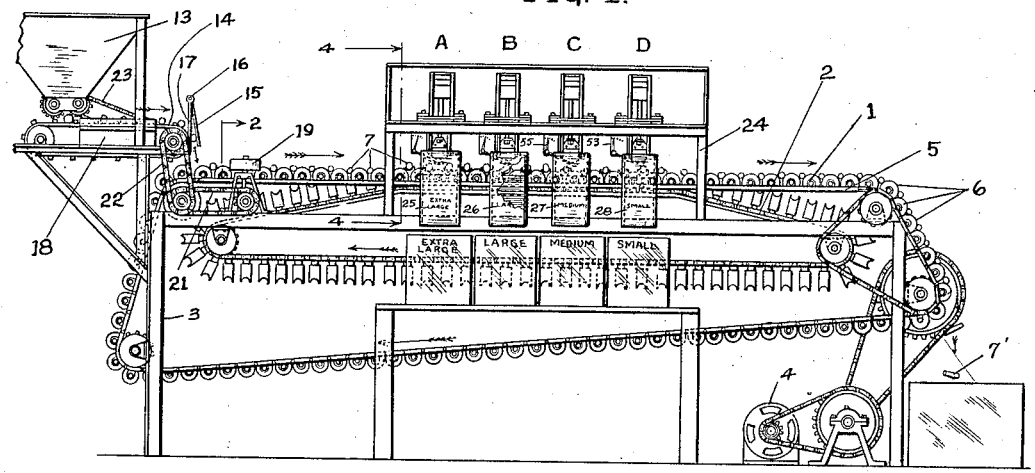
Figure 2:
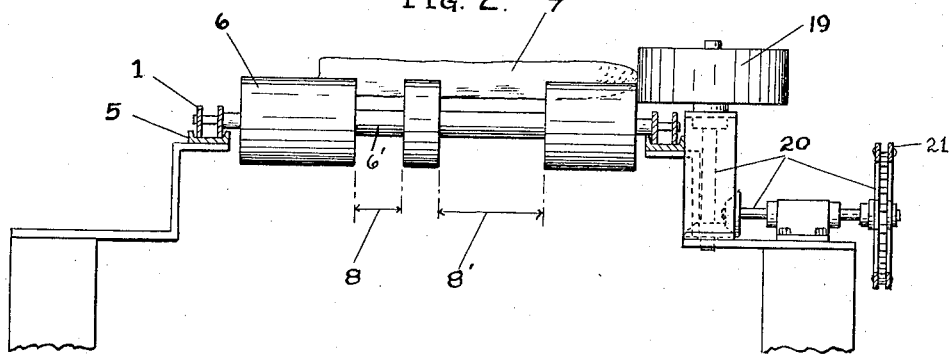
Fig. 2 is an enlarged cross section of a portion of the apparatus as seen from the line 2—2 of Fig. 1.

In Fig. 1 there are two principal conveyors 1 and 2 of the horizontal endless chain type suitably supported on wheels indicated on a frame-work 3 and driven by suitable chain or other gearing from a motor 4 or other source of power all in the well understood manner.

Conveyor 1 is continuously supported for travel along its upper run by guides or tracks 5 and carries a plurality of transversely extending rollers 6 so spaced that spears of asparagus 7 deposited thereon will not fall through. The rollers 6 are also provided with gaps 8, 8' so as to provide spaces for entry of the buckets or chairs 9, 9' of conveyor 2.

Conveyor 2 is supported on guide or track 10 and carries spaced blocks 9, 9' formed on top with bucket-shaped or crescent depressions 11 somewhat higher at their rear ends as at 12 so as to form chairs to receive each one spear of asparagus.

Figure 3:
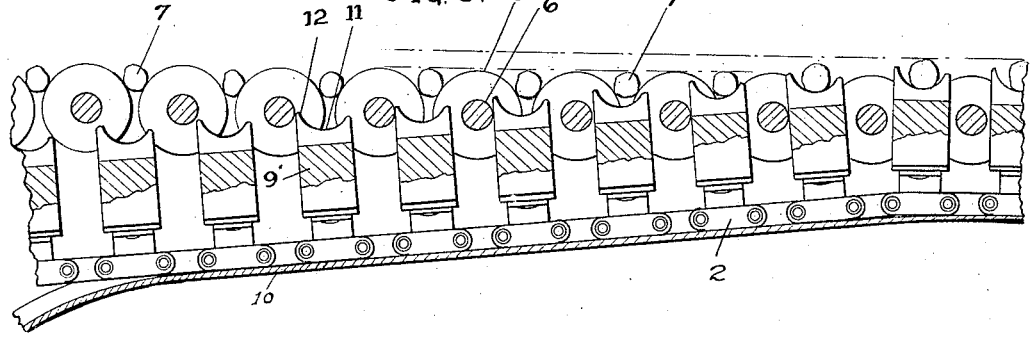
Fig. 3 is an enlarged longitudinal section of a portion of the cooperating conveyors which carry the grass passed the automatic grading and cutting devices.

Chairs 9, 9' are of a length to fit easily into gaps 8, 8' of rollers 6 and also of a width to fit freely between the reduced portions 6' of adjacent rollers, and of a height to lift the asparagus spears clear from the rollers when brought up from below as indicated in Fig. 3.

The guiding support for conveyor 2 is gradually slanted upward toward conveyor 1 at the left hand end so that the chairs will fall into place in accordance with Fig. 3 and after traveling along parallel with conveyor 1 for a distance to accommodate the grading and cutting mechanism, is gradually lowered to withdraw the chairs at the right hand end of the conveyor as shown in Fig. 1.

At the extreme left of Fig. 1 is shown an elevated hopper 13 from which the asparagus spears are fed to a short feeder slat conveyor 14 which is conveniently driven by suitable chain or other gearing as indicated at 22 from conveyor 1 and which feeder conveyor overlies the upper horizontal run of conveyor 1 and deposits the spears of grass one by one between the rollers 6 after first striking a swinging retarder plate 15 pivoted at its upper end at 16 to suitable framing 17.

At the forward edge of feeder conveyor 14 is a vertical board or plate 18 against which an attendant gently pushes the tip of each spear of grass as it comes along, and after the spears are deposited between the rollers 6 of conveyor 1 they pass tips against a horizontally revolving aligning roller 19 geared to the conveyor as indicated at 20, 21 so as to travel at or about the same surface speed therewith, and which wheel gently but positively aligns the tips of the grass accurately before grading and cutting.

Mounted above the horizontal run of the two intermeshed conveyors are any number of grading and cutting mechanisms, the drawing showing four such mechanisms lettered generally A, B, C, D supported on framework 24 and discharging respectively into transversely extending chutes 25, 26, 27, 28 to receive successively smaller sizes of grass cut and kicked off by the mechanisms A, B, C, D.

Each of the aforesaid mechanisms is alike and independently mounted on a plate 29 slidable along a transversely extending guide 30 so that it may be adjusted longitudinally with respect to the particular size spears of grass it is to work on depending on the lengths of spears desired, and each mechanism includes a guillotine knife blade 31 arranged to descend vertically to cut the spear of grass and in so doing enter any one of several notches 32 extending transversely of the chairs in the upper edge thereof as best shown in Fig. 6, and which notches are wide enough to provide room for a kicking action of the blade in ejecting the tip end of the spear laterally immediately upon cutting the same. The butt end 7' of the spear is discharged at the end of the conveyor.

The descent of the knife is effected electrically and is controlled by the movement of a size grading finger 33 which rides each spear of grass coming along on the conveyor chairs and which closes a circuit upon being lifted by a size spear for which it is set to actuate the knife.

The construction of these parts is shown in Figs. 4 to 7, and in which the knife is mounted on a carriage 34 pivoted at 35 to a vertically moving plunger rod 36 so that the knife can swing transversely of its edge from the vertical position shown in Fig. 4 in a direction to the right only, being pulled back to vertical by a spring 37.

The carriage 34 has an arm 38 projecting to the right provided with an opening slidably embracing a rod or depending bolt 39 provided with an adjustable nut 40 at its lower end and against which the arm strikes after the knife has descended and just finished cutting the grass, so as to instantly rock the knife to the right and thus exert a quick kicking action on the cut end of the spear and eject the tip into one of the chutes (25 in Fig. 4). By adjusting the nut 40 the amount of kick may be determined.

Plunger rod 36 is actuated by a solenoid or equivalent magnet 41 through means of pivotal connection to a bracket 42 pivoted itself to the magnet base at 43 and preferably pulled back by a spring 44 anchored to adjustable base plate 29.

The solenoid circuit 45 is closed by a relay switch 46 in turn actuated by the closing of the grading finger switch contacts 47, 60 and circuit 48 connecting main line 49 through relay magnet to main line 50 as clearly indicated to anyone skilled in the art.

Relay switch 46 holds knife circuit 45 closed independent of movements of grading finger until descent of knife carries tripping screw 51 downward to strike end 52 of switch and break the control circuit, after which the knife is instantly raised by action of spring 44.

The grading finger 33 comprises a light wire formed at its lower end to ride over the passing spears of grass and pivotally mounted at its upper end in a little casing 53 on a shaft 54 running through the casing and provided at its forward end with a size-indicating pointer 55 which may be set to grade any desired diameter of grass by reference to a scale 56.

The shaft of the finger carries a loose sleeve 57 which may be clamped at any desired point of revolution together with the pointer, on the shaft by means of a thumb nut 58. The loose sleeve has projecting from it a switch tripping arm 59 operating against pivoted circuit switch contact 60 through means of a light spring 61 to normally break the circuit so that when swung back by the lifting of the grader finger 33 to the predetermined height for which it has been set, arm 59 will be swung to the left, switch member 60 under action of spring 62 will close with contact 47 to complete circuit 48 and actuate relay.

The object of mounting the grading and cutting mechanism as a unit on slidable base 29 is to keep all parts in proper relation yet provide for shifting the knife to cut away length of spear desired, that of each diameter being independent of the other.

The object of the chairs rising between the rollers of the conveyor is to lift the grass and give it a firm under support while cutting. This object may also be carried out by other means, such for instance as the special chair conveyor shown in Figs. 9 and 10 and wherein the conveyor 63 takes the place of the two intermeshing conveyors previously described and carries special chairs 64 provided with overlapping or mortised edges 65 so that as they come up to the horizontal run they will interlock in their mortised edges and thus form a continuous conveyor free from possibility of trapping any of the asparagus spears between the chairs or buckets.

Having thus described our invention and its use with asparagus, it is manifest that it may be useful with other vegetables of elon- gated form which it is desired to grade and cut, and therefore the use of the word "asparagus" in the specification and claims is not to be considered as limiting the invention or construction claimed in any respect.

We claim:

1. In a machine of the character described, means for passing asparagus spears along a path of travel, and a blade arranged and adapted for simultaneously cutting said spears to length and ejecting them from said path of travel.

2. In a machine of the character described, means for passing asparagus spears along a path of travel, and means for simultaneously grading said spears for size and cutting said spears to length and ejecting them from said path of travel.

3. In a machine of the character described, means for passing asparagus spears along a path of travel, a knife arranged to descend and cut the spears as they pass along, and means for moving the knife to thereby eject the cut spear in a lateral direction.

4. A construction as specified in claim 3 plus means for controlling the movements of said knife influenced by the diameter of the spear to be cut.

5. In a machine of the character described, means for passing asparagus spears along a path of travel, a knife arranged to descend and cut the spears as they pass along, electrically operated means for operating said knife and means for moving the knife to thereby eject the cut spear in a lateral direction, a relay switch closing the circuit of the knife operating means, and means for operating the relay switch influenced by the diameter of the spear to be cut.

6. In a machine of the character described, a conveyor adapted to convey asparagus spears along a path of travel, a plurality of combined asparagus grading, cutting and ejecting units mounted across the top of the conveyor and means whereby said units are adjustable transversely of said conveyor.

7. In a machine of the character described, an endless conveyor provided with transversely extending rollers spaced to retain between adjacent rolls a spear of asparagus, a second conveyor provided with devices adapted to pass between the spaced rolls of the first conveyor during the travel of the conveyors, said devices being formed to engage and lift the spears from said rolls, means for grading the spears for size while on said devices, and means for cutting the spears to length and ejecting them from said devices.

8. In a machine of the character described, means for supporting a spear of asparagus for cutting to length, a guillotine knife arranged to cut the spear upon descent of the knife, means whereby said knife is moved in a lateral direction upon cutting the spear so as to kick away the cut spear.

SILAS H. CHAMPLIN.
PARKER A. CUTTER.
FERDINAND KASTEN.
PAUL C. BUTTE.